(12) United States Patent
Tokushima et al.

(10) Patent No.: US 9,036,208 B2
(45) Date of Patent: May 19, 2015

(54) PRINT CONTROLLING APPARATUS, IMAGE FORMING SYSTEM, AND COMPUTER PROGRAM PRODUCT

(71) Applicants: Yuji Tokushima, Kanagawa (JP); Hiroaki Suzuki, Chiba (JP)

(72) Inventors: Yuji Tokushima, Kanagawa (JP); Hiroaki Suzuki, Chiba (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/467,466

(22) Filed: Aug. 25, 2014

(65) Prior Publication Data

US 2015/0062601 A1 Mar. 5, 2015

(30) Foreign Application Priority Data

Aug. 28, 2013 (JP) ................................. 2013-177252

(51) Int. Cl.
*H04N 1/60* (2006.01)
*G03G 15/00* (2006.01)
*G06K 1/00* (2006.01)

(52) U.S. Cl.
CPC .... *G03G 15/6585* (2013.01); *G03G 2215/0081* (2013.01)

(58) Field of Classification Search
None
See application file for complete search history.

(56) References Cited

U.S. PATENT DOCUMENTS

| 8,711,427 | B2 | 4/2014 | Tokushima et al. |
| 2012/0062956 | A1 | 3/2012 | Kitagawa et al. |
| 2012/0063802 | A1 | 3/2012 | Suzuki et al. |
| 2012/0237244 | A1 | 9/2012 | Yoshikawa et al. |
| 2012/0237247 | A1* | 9/2012 | Tokushima et al. .............. 399/82 |
| 2013/0271792 | A1* | 10/2013 | Awamura et al. ............ 358/3.01 |
| 2013/0278943 | A1 | 10/2013 | Kurosawa et al. |
| 2013/0278952 | A1 | 10/2013 | Suzuki et al. |
| 2013/0278953 | A1 | 10/2013 | Yukie et al. |
| 2013/0279958 | A1 | 10/2013 | Yukie et al. |

FOREIGN PATENT DOCUMENTS

JP 2012-083736 4/2012

* cited by examiner

*Primary Examiner* — Quang N Vo
(74) *Attorney, Agent, or Firm* — Oblon, McClelland, Maier & Neustadt, L.L.P.

(57) ABSTRACT

A print controlling apparatus includes: a receiving unit that receives input data including: gloss control plane data indicating a surface effect type to be achieved on the recording medium with certain density information; and table identifying information for identifying a surface effect selection table indicating a corresponding relation between the surface effect type and the density information used to generate the gloss control plane data; an acquiring unit that acquires an independent data portion indicating a portion corresponding to the surface effect type capable of being achieved independent from competence of the printing apparatus, out of the surface effect selection table identified by the table identifying information included in the input data from an external device; and a generating unit that generates the clear toner plane data using the independent data portion acquired by the acquiring unit.

6 Claims, 16 Drawing Sheets

| GLOSS CONTROL NAME | GLOSS | DEVIATION |
|---|---|---|
| PREMIUM GLOSS (PG) | Gs≥80 | ΔGs≤10 |
| GLOSS (G) | Gs=Gs (GLOSS) | ΔGs≤10 |
| MATT (M) | Gs=Gs (1C30% HALFTONE) | ΔGs≤10 |
| PREMIUM MATT (PM) | Gs≤10 | ΔGs≤10 |

FIG.5

SURFACE EFFECT SELECTION TABLE TO WHICH ID INDICATING "00001" IS ASSIGNED

| DATA ID | DENSITY (%) | DENSITY | | EFFECT | |
| --- | --- | --- | --- | --- | --- |
| | | REPRE-SENTATIVE VALUE | RANGE OF VALUE | | |
| | 98% | 250 | 248 | 255 | PREMIUM GLOSS TYPE A |
| | 96% | 245 | 243 | 247 | PREMIUM GLOSS TYPE B |
| | 94% | 240 | 238 | 242 | PREMIUM GLOSS TYPE C |
| | 92% | 235 | 233 | 237 | RESERVED |
| UD00003 | 54% | 138 | 136 | 140 | USER-DEFINED PATTERN 03 |
| UD00002 | 52% | 133 | 131 | 135 | USER-DEFINED PATTERN 02 |
| UD00001 | 50% | 128 | 126 | 130 | USER-DEFINED PATTERN 01 |
| | 48% | 122 | 120 | 125 | RESERVED |
| | 46% | 117 | 115 | 119 | RESERVED |
| WM00003 | 44% | 112 | 110 | 114 | WATERMARK CHARACTER 3 (CONFIDENTIAL) |
| WM00002 | 42% | 107 | 105 | 109 | WATERMARK CHARACTER 2 (REPRODUCTION STRICTLY PROHIBITED) |
| WM00001 | 40% | 102 | 100 | 104 | WATERMARK CHARACTER 1 (EXAMPLE) |
| | 38% | 97 | 95 | 99 | RESERVED |
| | 36% | 92 | 90 | 94 | RESERVED |
| TX00003 | 34% | 87 | 85 | 89 | BACKGROUND PATTERN 3 (BRICKS) |
| TX00002 | 32% | 82 | 80 | 84 | BACKGROUND PATTERN 2 (GRID) |
| TX00001 | 30% | 76 | 74 | 79 | BACKGROUND PATTERN 1 (WAVES) |
| | 28% | 71 | 69 | 73 | RESERVED |
| | 26% | 66 | 64 | 68 | RESERVED |

UD00003–UD00001: INDEPENDENT FROM PRINTER
WM00003–WM00001: INDEPENDENT FROM PRINTER
TX00003–TX00001: INDEPENDENT FROM PRINTER

FIG.6

SURFACE EFFECT SELECTION TABLE TO WHICH ID INDICATING "00002" IS ASSIGNED

| DATA ID | DENSITY (%) | DENSITY | | EFFECT | |
|---|---|---|---|---|---|
| | | REPRE-SENTATIVE VALUE | RANGE OF VALUE | | |
| | 98% | 250 | 248 | 255 | PREMIUM GLOSS TYPE A |
| | 96% | 245 | 243 | 247 | PREMIUM GLOSS TYPE B |
| | 94% | 240 | 238 | 242 | PREMIUM GLOSS TYPE C |
| | 92% | 235 | 233 | 237 | RESERVED |
| UD00006 | 54% | 138 | 136 | 140 | USER-DEFINED PATTERN 06 |
| UD00005 | 52% | 133 | 131 | 135 | USER-DEFINED PATTERN 05 |
| UD00004 | 50% | 128 | 126 | 130 | USER-DEFINED PATTERN 04 |
| | 48% | 122 | 120 | 125 | RESERVED |
| | 46% | 117 | 115 | 119 | RESERVED |
| WM00006 | 44% | 112 | 110 | 114 | WATERMARK CHARACTER 3 (CONFIDENTIAL) |
| WM00005 | 42% | 107 | 105 | 109 | WATERMARK CHARACTER 2 (COPY) |
| WM00004 | 40% | 102 | 100 | 104 | WATERMARK CHARACTER 1 (DRAFT) |
| | 38% | 97 | 95 | 99 | RESERVED |
| | 36% | 92 | 90 | 94 | RESERVED |
| TX00006 | 34% | 87 | 85 | 89 | BACKGROUND PATTERN 3 (SCALE PATTERN) |
| TX00005 | 32% | 82 | 80 | 84 | BACKGROUND PATTERN 2 (DROPS) |
| TX00004 | 30% | 76 | 74 | 79 | BACKGROUND PATTERN 1 (STAR-DOT PATTERN) |
| | 28% | 71 | 69 | 73 | RESERVED |
| | 26% | 66 | 64 | 68 | RESERVED |

- UD00004–UD00006: INDEPENDENT FROM PRINTER
- WM00004–WM00006: INDEPENDENT FROM PRINTER
- TX00004–TX00006: INDEPENDENT FROM PRINTER

PRINT CONTROLLING APPARATUS, IMAGE FORMING SYSTEM, AND COMPUTER PROGRAM PRODUCT

CROSS-REFERENCE TO RELATED APPLICATION(S)

The present application claims priority to and incorporates by reference the entire contents of Japanese Patent Application No. 2013-177252 filed in Japan on Aug. 28, 2013.

BACKGROUND OF THE INVENTION

1. Field of the Invention

The present invention relates to a print controlling apparatus, an image forming system, and a computer program product.

2. Description of the Related Art

Conventionally, as disclosed in Japanese Patent Application Laid-open No. 2012-83736, for example, a technology has been widely known in which a desired surface effect is provided on a recording medium by using a clear toner and a plurality of types of surface effect are applied to one page of a recording medium. In the technology disclosed in Japanese Patent Application Laid-open No. 2012-83736 a host apparatus includes a density value selection table that is a part of the data in a surface effect selection table implemented in advance in a digital front end (DFE), that is, a print controlling apparatus. The DFE generates clear toner plane data for causing a clear (colorless) toner to be attached on a recording medium based on gloss control plane data generated from the density value selection table and a preliminarily implemented surface effect selection table. The DFE outputs the generated clear toner plane data.

In the conventional technology, however, if gloss control plane data based on a surface effect selection table different from the surface effect selection table implemented in advance in the DFE is input to the DFE, the print result assumed on the host apparatus cannot be achieved.

In light of the above, there is a need to provide a print controlling apparatus, an image forming system, and a computer program product capable of providing a print result equivalent to the expected print result if gloss control plane data based on a surface effect selection table different from the surface effect selection table implemented in advance is input.

SUMMARY OF THE INVENTION

It is an object of the present invention to at least partially solve the problems in the conventional technology.

A print controlling apparatus is equipped with at least one color toner and at least one colorless clear toner and controls a printing apparatus forming an image on a recording medium based on one or more pieces of color plane data for causing the color toner to be attached and one or more pieces of clear toner plane data for causing the clear toner to be attached. The print controlling apparatus includes: a receiving unit that receives input data including: gloss control plane data indicating a surface effect type to be achieved on the recording medium with certain density information; and table identifying information for identifying a surface effect selection table indicating a corresponding relation between the surface effect type and the density information used to generate the gloss control plane data; an acquiring unit that acquires an independent data portion indicating a portion corresponding to the surface effect type capable of being achieved independent from competence of the printing apparatus, out of the surface effect selection table identified by the table identifying information included in the input data from an external device; and a generating unit that generates the clear toner plane data using the independent data portion acquired by the acquiring unit.

An image forming system includes: a print controlling apparatus that is equipped with at least one color toner and at least one colorless clear toner and controls a printing apparatus forming an image on a recording medium based on one or more pieces of color plane data for causing the color toner to be attached and one or more pieces of clear toner plane data for causing the clear toner to be attached; and a server apparatus connected to the print controlling apparatus over a network. The image forming system includes: a receiving unit that receives input data including: gloss control plane data indicating a surface effect type to be achieved on the recording medium with certain density information; and table identifying information for identifying a surface effect selection table indicating a corresponding relation between the surface effect type and the density information used to generate the gloss control plane data; an acquiring unit that acquires an independent data portion indicating a portion corresponding to the surface effect type capable of being achieved independent from competence of the printing apparatus, out of the surface effect selection table identified by the table identifying information included in the input data; and a generating unit that generates the clear toner plane data using the independent data portion acquired by the acquiring unit.

A computer program product includes a non-transitory computer-readable medium containing an information processing program. The program causing a print controlling apparatus that comprises at least one color toner and at least one colorless clear toner and controls a printing apparatus forming an image on a recording medium based on one or more pieces of color plane data for causing the color toner to be attached and one or more pieces of clear toner plane data for causing the clear toner to be attached, to execute: receiving input data including: gloss control plane data indicating the surface effect type to be achieved on the recording medium with certain density information; and table identifying information for identifying the surface effect selection table indicating a corresponding relation between the surface effect type and the density information used to generate the gloss control plane data; acquiring an independent data portion indicating a portion corresponding to the surface effect type capable of being achieved independent from competence of the printing apparatus, out of the surface effect selection table identified by the table identifying information included in the input data from an external device; and generating the clear toner plane data using the independent data portion acquired at the acquiring.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a diagram illustrating a surface effect selection table according to the first embodiment;

FIG. 6 is a diagram illustrating a surface effect selection table according to the first embodiment;

DETAILED DESCRIPTION OF THE PREFERRED EMBODIMENTS

Some embodiments of a print controlling apparatus, an image forming system, and a computer program according to the present invention will now be explained in detail with reference to the appended drawings.

First Embodiment

Figures 1, 2:
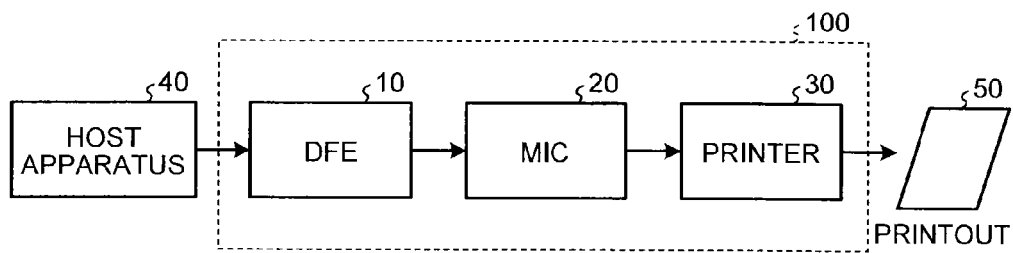
FIG. 1 is a diagram illustrating the configuration of an image forming system according to a first embodiment of the present invention.
FIG. 2 is a diagram illustrating types of surface effects related to the presence of gloss according to the first embodiment.

FIG. 1 is a block diagram illustrating the configuration of an image forming system according to a first embodiment. As illustrated in FIG. 1, the image forming system is configured as to connect a host apparatus 40 such as a personal computer (PC) and an image forming apparatus 100. The image forming apparatus 100 is configured as to connect a print controlling apparatus (digital front end (DFE)) 10, an interface controller (mechanism interface (I/F) controller (MIC)) 20, and a printer 30.

The DFE 10 communicates with the printer 30 via the MIC 20, and controls image formation performed by the printer 30. The host apparatus 40 is connected to the DFE 10 (the connection may be established over a network). The DFE 10 receives image data from the host apparatus 40, and uses the image data to generate another piece of image data for causing the printer 30 to form toner images with the toner in each of the CMYK colors and the clear toner. The DFE 10 then transmits the image data to the printer 30 via the MIC 20. The printer 30 is equipped with at least toner in each of the CMYK colors and clear toner, and equipped with an image forming unit including a photosensitive element, a charging unit, a developing device, and a photosensitive element cleaner, and an exposing unit, and fixing unit corresponding to each of these toners.

Clear toner herein means transparent (colorless) toner not containing any color material. Being transparent (colorless) means having a transmissivity equal to or higher than 70 percent, for example.

The printer 30 irradiates the photosensitive element with a light beam from the exposing unit based on the image data received from the DFE 10 via the MIC 30, so that a toner image is formed on the photosensitive element using corresponding toner. The toner image is then transferred onto a recording medium such as a paper sheet. The fixing unit then fixes the toner image under heat at a temperature within a predetermined range (standard temperature) and pressure. In this manner, an image is formed on a transfer sheet (an example of a recording medium) and a desired printout 50 is achieved. The configuration of the printer 30 as described above is widely known; therefore, detailed explanation thereof is omitted. A paper sheet is merely an example of a recording medium, and a recording medium is not limited thereto. For example, synthetic paper, plastic sheet may also be used as a recording medium.

Image data (document data) received from the host apparatus 40 will now be explained. In the host apparatus 40, a pre-installed image processing application generates the image data, and transmits the image data to the DFE 10. Such an image processing application is capable of handling image data of a special color plane, by contrast to image data in which a value representing a density (hereinafter, referred to as a density value) is specified to each pixel of color planes, such as red, green, and blue (RGB) color planes, or cyan, magenta, yellow, and black (CMYK) color planes. A special color plane herein is data of an image for causing special toner or special ink, e.g., toner or ink in a color such as white, gold, or silver other than the basic colors such as CMYK or RGB, to be attached. Such data is intended for a printer equipped with such special toner or special ink. In order to improve the color reproducibility, a special color plane sometimes adds the R color to the CMYK basic colors, or the Y color to the RGB basic colors. Usually, clear toner is handled as one of the special colors.

In the first embodiment, in order to achieve a surface effect being a visual effect or a haptic effect provided to a transfer sheet, clear toner, which is considered a special color, is used. The image processing application in the host apparatus 40 thus generates image data of gloss control plane (hereinafter may be referred to as "gloss control plane data) specified by a user as image data of the special color plane in addition to image data of a color plane (hereinafter may be referred to as the "color plane data") for the input image data (the received document data).

The data of a color plane is image data in which each pixel is specified with a density value of a color, e.g., R, G, or B color, or C, M, Y, or K color. In the data of a color plane, one pixel is represented by eight bits, based on the color specified by a user. The data of a gloss control plane is image data for controlling to allow clear toner to be attached in the manner specified as a surface effect, e.g., a visual effect or a haptic effect, provided to a transfer sheet. In the image data of a gloss control plane, the area to which such a surface effect is provided and the type of the surface effect are specified.

Each pixel in the data of a gloss control plane is represented by an eight-bit density value which ranges from "0" to "255" (an example of density information), in the same manner as a color plane for an RGB color, a CMYK color, or the like. (Alternatively, the density value may be represented by 16 bits or 32 bits, or 0 percent to 100 percent.) A surface effect type is associated to the density value. Because the same value is set to the pixels included in the area to be provided with the same surface effect, regardless of the density of the clear toner actually attached, the area can be easily identified from the image data, even without any data indicating such an area. In other words, the data of a gloss control plane indicates the area provided with a surface effect, as well as the surface effect type provided to the area. (Alternatively, some data for indicating such an area may be provided separately). It can be perceived that the gloss control plane data is image data (image information) indicating the surface effect type to be achieved on a recording medium with certain density information.

The host apparatus 40 generates the data of a gloss control plane in a vector format by setting a surface effect type specified by a user on the image processing application to each drawn object, as a density value serving as a gloss control value.

Each of the pixels in the data of a gloss control plane corresponds to each pixel in the data of a color plane. In these pieces of image data, the density value set to each pixel serves as a pixel value. The image data of a color plane and the image data of a gloss control plane are both implemented in units of a page.

Types of surface effects can generally be classified into those related to gloss, those related to surface protections, watermarks in which information is embedded, and textures. The surface effects related to gloss are generally classified into four types, as illustrated in FIG. 2. Such types include premium gloss (PG), Gloss (G), Matt (M), and Premium Matt (PM), in the descending order of gloss (degree of glossiness). Hereinafter, the Premium Gloss may be referred to as "PG", the Gloss may be referred to as "G", the Matt may be referred to as "M", and the Premium Matt may be referred to as "PM".

The Premium Gloss or the Gloss achieves a highly glossy effect. By contrast, the Matt or the Premium Matt is intended to suppress gloss. In particular, the Premium Matt achieves a gloss level lower than that of a standard transfer sheet. In FIG. 2, the Premium Gloss is indicated to achieve a gloss level Gs of 80 or higher. The Gloss is indicated to achieve a gloss level that is achieved by a primary color or a secondary color. The Matt is indicated to achieve a gloss level that is achieved by a primary color and with a 30-percent halftone. The Premium Matt is indicated to achieve a gloss level of 10 or lower. The deviation of the gloss level is indicated as $\Delta Gs$, and set to 10 or lower. Among such surface effect types, a surface effect achieving a high gloss level is associated with a high density value, and a surface effect suppressing gloss is associated with a low density value. Surface effects such as watermarks and textures are associated with density values between these two extremes. Used as a watermark are characters or surface patterns, for example. A texture represents characters or patterns, and can achieve a haptic effect as well as a visual effect. For example, a stained-glass pattern can be achieved using clear toner. A surface protection is achieved by the Premium Gloss or the Gloss.

The user specifies, via image processing application, in which area of an image represented by image data to be processed is provided with a surface effect, and which type of surface effects is to be provided to the area. The host apparatus 40 running the image processing application generates data of a gloss control plane by setting a density value corresponding to the surface effect designated by a user to a drawn object included in the area designated by the user. The relation between a density value and a surface effect type will be described later. The surface effects are grouped, hereinafter, into two types: "dependent on the printer" and "independent from the printer". The surface effect of "dependent on the printer" is a surface effect that can be achieved or cannot be achieved depending on the competence (the printing competence for each model, or the competence depending on the presence of a glosser or other post-processing apparatuses) of the printer 30 performing premium-gloss printing or gloss-printing. By contrast, the surface effect of "independent from the printer" is a surface effect that the achieved pattern by the clear toner such as a watermark or a texture is determined in advance regardless of the competence of the printer 30.

In the first embodiment, the image of a gloss control plane being image data of a special color plane is generated by the image processing application in the host apparatus 40 on a plane other than the data of color planes. The portable document format (PDF) is used for the data of a color plane and the data of a gloss control plane. The PDF image data of each of these planes is integrated and generated as document data. The data format of the image data of these planes is not limited to the PDF, and any format may also be used.

Figure 3:
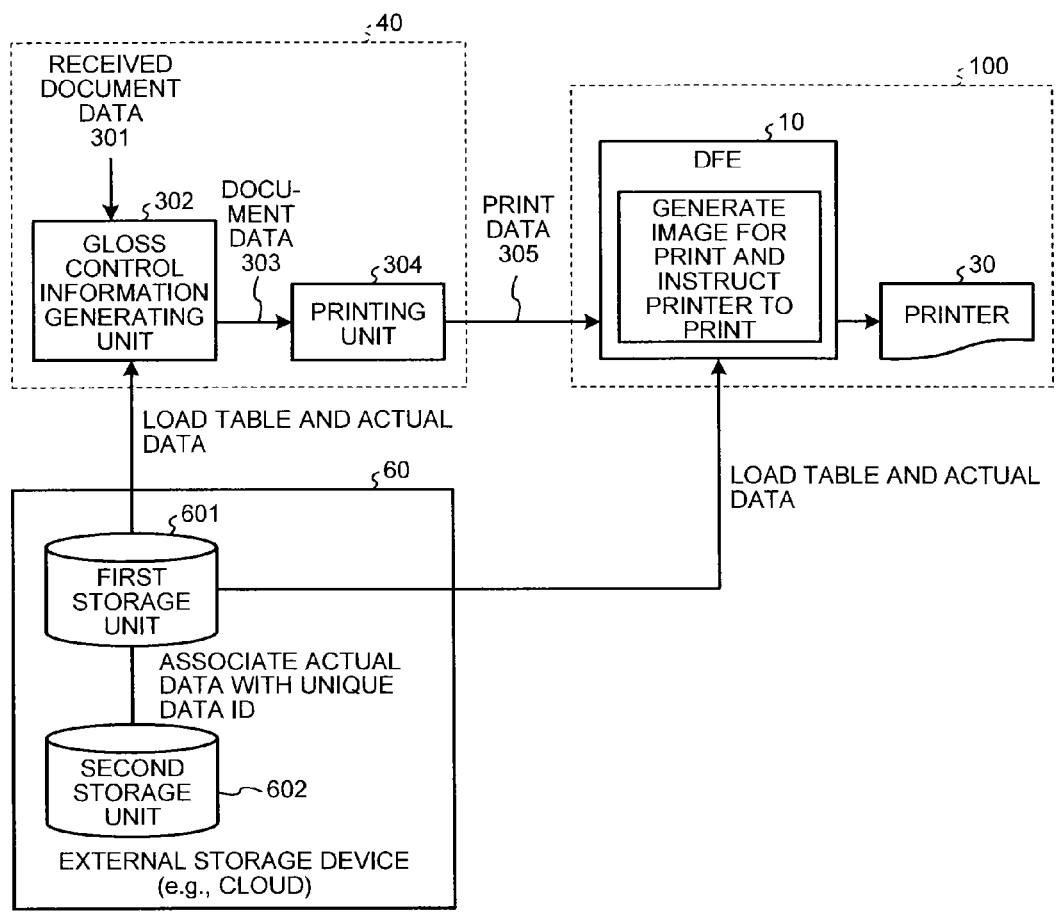
FIG. 3 is a diagram for explaining a process performed by the image forming system according to the first embodiment.

The following describes a process performed by the image forming system according to the first embodiment with reference to FIG. 3. If a user wishes to acquire an effect with the clear toner, a gloss control information generating unit 302 included in the host apparatus 40 generates document data 303 by adding information indicating a specified portion to be drawn with the clear toner or a portion to which a glossy effect (e.g., premium gloss or premium matt) is applied, to received document data 301 in a portable document format (PDF), for example, according to an input by the user. The printing unit 304 included in the host apparatus 40 adds print operation settings (a print job command) to the document data 303 generated by the gloss control information generating unit 302. The printing unit 304 generates print data 305 and transmits the generated print data 305 to the DFE 10. The print operation settings include a setting whether post-processes such as punching and stapling is used. The DFE 10 generates images used in the printer 30 and issues print instruction to the printer 30. The image data transmitted from the DFE 10 to the printer 30 is the information on the image itself formed on the photosensitive drum with the CMYK toners and the clear toner. If a glosser serving as a post-processing apparatus is used when the premium gloss is applied, for example, the DFE 10 transmits an instruction to set the glosser to ON to the printer 30.

The above-described gloss control information generating unit 302 loads (acquires) a surface effect selection table stored in an external storage device 60 according to an input by a user who is a designer, for example. The surface effect selection table is the information indicating a corresponding relation between the surface effect type and a density value of a pixel (an example of density information). Details on this will be later described. The external storage device 60 manages a plurality of types of surface effect selection tables using table IDs (IDs for identifying surface effect selection tables). It can be perceived that the table ID in this example corresponds to the "table identifying information" in the claim herein. The external storage device 60 includes a first storage unit 601 and a second storage unit 602. The first storage unit 601 stores therein the surface effect selection tables associated with the respective table IDs. In the surface effect selection table, a data ID (a unique ID) is related to each density value associated with the surface effect independent from the printer. The data ID identifies actual data (e.g., a pattern image) used for achieving the surface effect. Details on this will be later described. The second storage unit 602 then stores therein the actual data associated with each data ID. The portion corresponding to the data independent from the printer, hereinafter, may be called an independent data portion (it can be perceived that the independent data portion in this example is information in which the density value, the surface effect type, and the actual data are associated with each other) out of the data in the surface effect selection table. By contrast, the portion corresponding to the data dependent on the printer may be called a dependent data portion out of the data in the surface effect selection table. In this example, the external storage device 60 corresponds to the "external device" in the claim herein.

The gloss control information generating unit 302 generates gloss control plane data by setting the density value of a drawn object specified with a given surface effect by the user to a value corresponding to the surface effect type, by referring to the density value selection table loaded (acquired) from the external storage device 60. The gloss control information generating unit 302 subsequently outputs to the printing unit 304 the document data 303 including the generated gloss control plane data and the table ID for identifying the surface effect selection table (the surface effect selection table loaded from the external storage device 60) used for generating the gloss control plane data. The printing unit 304 generates the print data 305 based on the document data 303 generated by the gloss control information generating unit 302 and outputs the generated print data 305 to the DFE 10. In this example, the print data 305 includes at least the gloss control plane data generated by the gloss control information generating unit 302 and the table ID for identifying the surface effect selection table used for generating the gloss control plane data.

The DFE 10 analyzes the table ID contained in the print data 305. If the surface effect selection table identified by the table ID is different from the surface effect selection table implemented in advance in the DFE 10, the DFE 10 loads the surface effect selection table identified by the table ID from the external storage device 60, rasterizes the gloss control plane data, and instructs the printer 30 to print.

Figure 4:
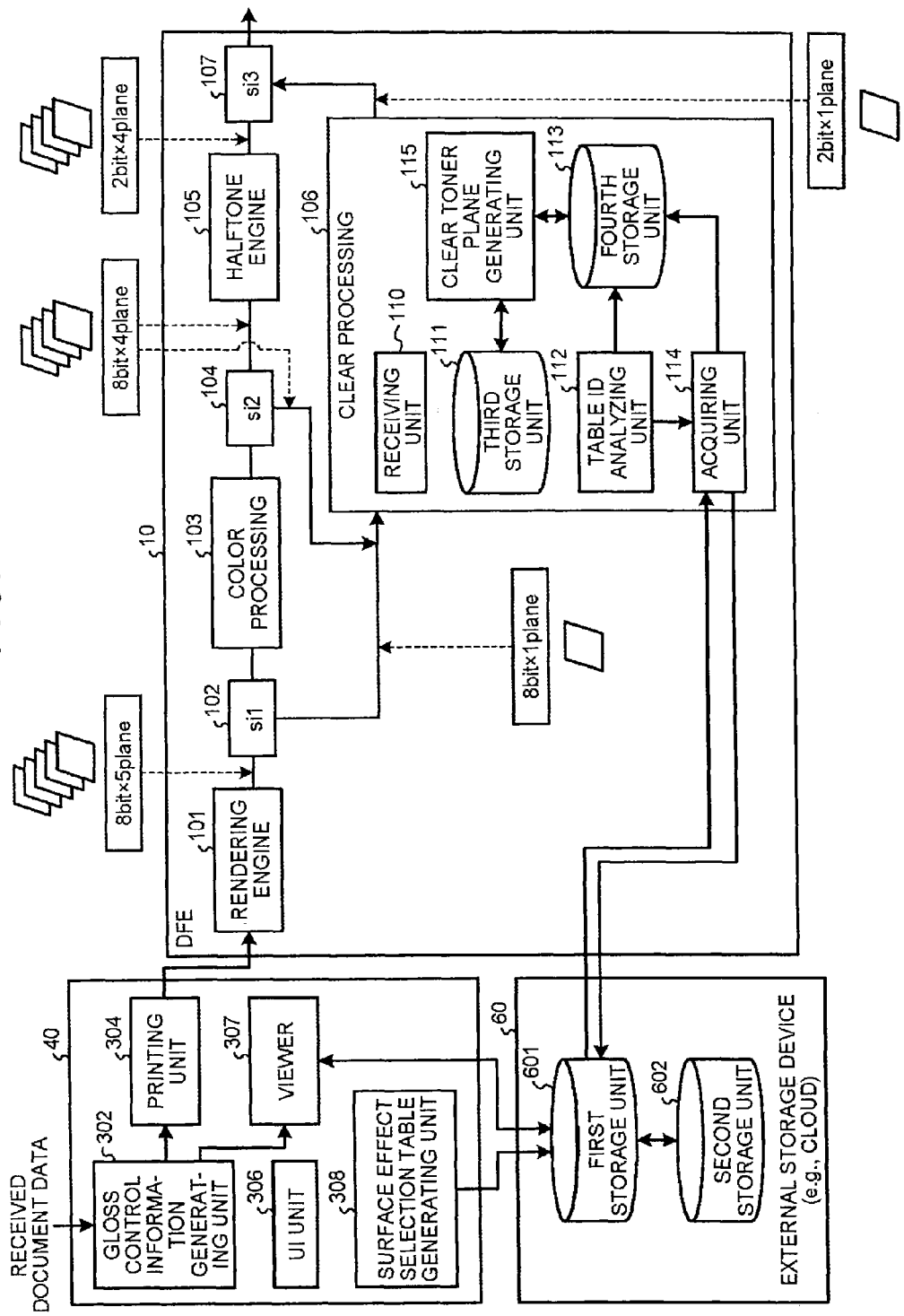
FIG. 4 is a diagram illustrating the functional configuration of the image forming system according to the first embodiment.

FIG. 4 is a detailed diagram illustrating the functional configuration of the image forming system according to the first embodiment. The host apparatus 40 includes the above-described gloss control information generating unit 302, the above-described printing unit 304, a user interface (UI) unit 306, a viewer 307, and a surface effect selection table generating unit 308.

The UI unit 306 displays thereon various types of information and receives various types of instructions. The viewer 307 generates a preview image for a preview based on the gloss control plane data generated by the gloss control information generating unit 302, and displays the generated preview image on the UI unit 306. The viewer 307, for example, integrates the color plane data with the special color plane data obtained by adding the color corresponding to the density value (e.g., light blue or blue) to a transparent area in the gloss control plane data. The viewer 307 can display the integrated image as a preview image on the UI unit 306.

The surface effect selection table generating unit 308 registers and deletes watermark characters or texture patterns according to an input by the user, thereby generating the surface effect selection table. The external storage device 60 assigns the table ID to the respective surface effect selection tables generated by the surface effect selection table generating unit 308, and manages the surface effect selection tables. The surface effect selection table stored in the external storage device 60 is loaded from the gloss control information generating unit 302 via the viewer 307. A preview image is displayed according to the gloss control plane data generated using the loaded surface effect selection table.

The external storage device 60 is connected to a storage server on a network such as the Internet (cloud), and includes the above-described first storage unit 601 and the above-described second storage unit 602. In the present embodiment, the surface effect selection table stored in the external storage device 60 is shared between the host apparatus 40 and the DFE 10. The host apparatus 40 generates the print data. The DFE 10 analyzes the print data and generates the clear toner plane data for causing the clear toner to be attached.

A functional configuration of the DFE 10 will now be explained. As illustrated in FIG. 4, The DFE 10 includes a rendering engine 101, a si1 unit 102, a color processing 103, a si2 unit 104, a halftone engine 105, a clear processing 106, and a si3 unit 107.

The rendering engine 101 receives image data (in this example, the print data described above) transmitted by the host apparatus 40. The rendering engine 101 parses the image data thus received, converts the image data in a vector format into image data in a raster format, and converts the color space represented in the RGB format into the color space represented in the CMYK format. The rendering engine 101 then outputs eight-bit image data of each of the CMYK color planes (data of a color plane), and an eight-bit data of gloss control plane. The si1 unit 102 outputs the eight-bit data of a color plane to the color processing 103, and outputs the eight-bit data of gloss control plane to the clear processing 106. In this example, the si1 unit 102 outputs the table ID contained in the print data transmitted from the host apparatus 40 to the clear processing 106.

The color processing 103 receives the eight-bit image data for each of the CMYK color planes (the data of a color plane) via the si1 unit 102. The color processing 103 performs a gamma correction using a gamma curve of a one-dimensional lookup table (1D_LUT) that is generated by a calibration to the data of a color plane thus received. In addition to the gamma correction, as the image processing, the total amount of toner is restricted. Restricting the total amount of toner is a process for restricting the eight-bit image data of each of the CMYK color planes after the gamma correction. This process is performed because the amount of toner by which the printer 30 is capable of applying to one pixel on a recording medium is limited. If printing is performed in excess of the total amount toner thus restricted, the image quality deteriorates because of defective transfer or defective fixing. Detailed description on restricting the total amount of toner is omitted here.

The si2 unit 104 outputs the data of a color plane having undergone the gamma correction by the color processing 103 to the clear processing 106, as data for generating an inverse mask. The data of a color plane after the gamma correction is input to the halftone engine 105 receives via the si2 unit 104. The halftone engine 105 performs a halftoning process in which the image data thus received is converted into image data in a two-bit format, for example, in each of the CMYK colors to be output to the printer 30, and then outputs the data of a color plane after the halftoning process. The two bit is an example, and the data format is not limited to a two-bit format.

The clear processing 106 receives the eight-bit data of a gloss control plane converted by the rendering engine 101 via the si1 unit 102, and receives the eight-bit image data of each of the CMYK color planes (the data of a color plane) on which the color processing 103 performs the gamma correction, via the si2 unit 104. The clear processing 106 receives the table ID contained in the print data transmitted from the host apparatus 40 via the si1 unit 102. From a different point of view, it can be perceived that the clear processing 106 receives the data (corresponding to the "input data" in the claim herein) including the eight-bit data of a gloss control plane and the table ID.

As illustrated in FIG. 4, the clear processing 106 includes a receiving unit 110, a third storage unit 111, a table ID analyzing unit 112, a fourth storage unit 113, an acquiring unit 114, and a clear toner plane generating unit 115.

The receiving unit 110 receives the eight-bit data of a gloss control plane, the eight-bit data of a color plane, and the table ID received by the clear processing 106. The third storage unit 111 stores therein the received gloss control plane data.

The table ID analyzing unit 112 determines whether the surface effect selection table identified by the table ID received by the receiving unit 110 coincides with the surface effect selection table stored in advance in the fourth storage unit 113 (the surface effect selection table implemented in advance in the DFE 10, which includes the dependent data portion and the independent data portion in this example). If the table ID analyzing unit 112 determines that the surface effect selection table identified by the table ID received by the receiving unit 110 does not coincide with the surface effect selection table stored in advance in the fourth storage unit 113, the acquiring unit 114 acquires the independent data portion in the surface effect selection table identified by the table ID received by the receiving unit 110 from the external storage device 60. The acquiring unit 114 then replaces the independent data portion in the surface effect selection table implemented in advance in the DFE 10 with the independent data portion acquired from the external storage device 60.

This is provided merely for exemplary purpose and is not limited to this example. For example, the acquiring unit 114 may acquire the dependent data portion in the surface effect selection table identified by the table ID received by the receiving unit 110 and the independent data portion in the surface effect selection table from the external storage device 60. The acquiring unit 114 may subsequently register the acquired table information in the fourth storage unit 113 rather than the surface effect selection table implemented in advance in the DFE 10. Alternatively, the acquiring unit 114 may replace the surface effect selection table implemented in advance in the DFE 10 with the acquired table information. Furthermore, the acquiring unit 114 may always acquire the dependent data portion and the independent data portion in the surface effect selection table identified by the table ID received by the receiving unit 110 from the external storage device 60 (i.e., the surface effect selection table is not implemented in advance in the DFE 10). In summary, the acquiring unit 114 includes at least the function of acquiring the independent data portion in the surface effect selection table identified by the table ID received by the receiving unit 110 from the external storage device 60.

The clear toner plane generating unit 115 uses the gloss control plane data (the received gloss control plane data) stored in the third storage unit 111 to determine the surface effect corresponding to the density value of each of the pixels (a pixel value) in the gloss control plane data by referring to the surface effect selection table stored in the fourth storage unit 113. Based on the determination result, the clear toner plane generating unit 115 also generates two-bit image data of the clear toner plane (hereinafter may be referred to as "clear toner plane data") for causing the clear toner to be attached, by generating an inverse mask or a solid mask as required, using the input color plane data. The clear toner plane generating unit 115 then outputs the generated clear toner plane data to the si3 unit 107. In this example, it can be perceived that the clear toner plane generating unit 115 corresponds to the "generating unit" in the claim herein. The si3 unit 107 integrates the two-bit image data of each of the CMYK colors after the half-toning process (color plane data) and the two-bit data of the clear toner planes generated by the clear processing 106, and outputs the image data thus integrated to the MIC.

The above-described surface effect selection table indicates the corresponding relation between a surface effect type and a density value. Various types of publicly known surface effect selection tables can be used for the surface effect selection table. FIG. 5 is a diagram illustrating a part of the surface effect selection table.

In the present embodiment, a table ID (the table ID indicating "00001" in the example in FIG. 5) is assigned to the surface effect selection table to identify the surface effect selection table. In the surface effect selection table according to the present embodiment, the above-described data ID is related to the density value of the corresponding surface effect type independent from the printer.

In the corresponding relation between the density value and the surface effect type illustrated in FIG. 5, each of the surface effect types is associated with a range of density values. Each of the surface effect types is associated with every two percent of a density ratio calculated from a value representing the density value range (density ratio). As a surface effect, the Premium Gloss (PM) is associated with pixel values (density values) between "238" to "255", as an example. Within this range, three different types of Premium Gloss are associated with a range of pixel values from "238" to "242", a range of pixel values from "243" to "247", and a range of pixel values from "248" to "255", respectively.

For example, as a surface effect, the user-defined pattern (an example of the surface effect independent from the printer) is associated with pixel values between "126" to "140". Within this range, three different types of the user-defined pattern are associated with a range of pixel values from "126" to "130", a range of pixel values from "131" to "135", and a range of pixel values from "136" to "140", respectively. The actual data of each of the user-defined patterns is related to one of the corresponding data IDs (either from "UD00001" to "UD00003").

In the same manner, as a surface effect, the watermark character pattern (an example of the surface effect independent from the printer) is associated with pixel values from "100" to "114". Within this range, three different types of the watermark character pattern are associated with a range of pixel values from "100" to "104", a range of pixel values from "105" to "109", and a range of pixel values from "110" to "114", respectively. The actual data of each of the watermark character patterns is related to one of the corresponding data IDs (either from "WM00001" to "WM00003").

In the same manner, as a surface effect, the background pattern (an example of the surface effect independent from the printer) is associated with pixel values from "74" to "89". Within this range, three different types of the background pattern are associated with a range of pixel values from "74" to "79", a range of pixel values from "80" to "84", and a range of pixel values from "85" to "89", respectively. The actual data of each of the background patterns is related to one of the corresponding data IDs (either from "TX00001" to "TX00003").

FIG. 6 is a diagram illustrating a part of a surface effect selection table in which each density value of the corresponding surface effect type independent from a printer is related to each data ID different from the data IDs in the surface effect type table illustrated in FIG. 5. A table ID indicating "00002" is assigned to the surface effect type table illustrated in FIG. 6.

Figure 7:
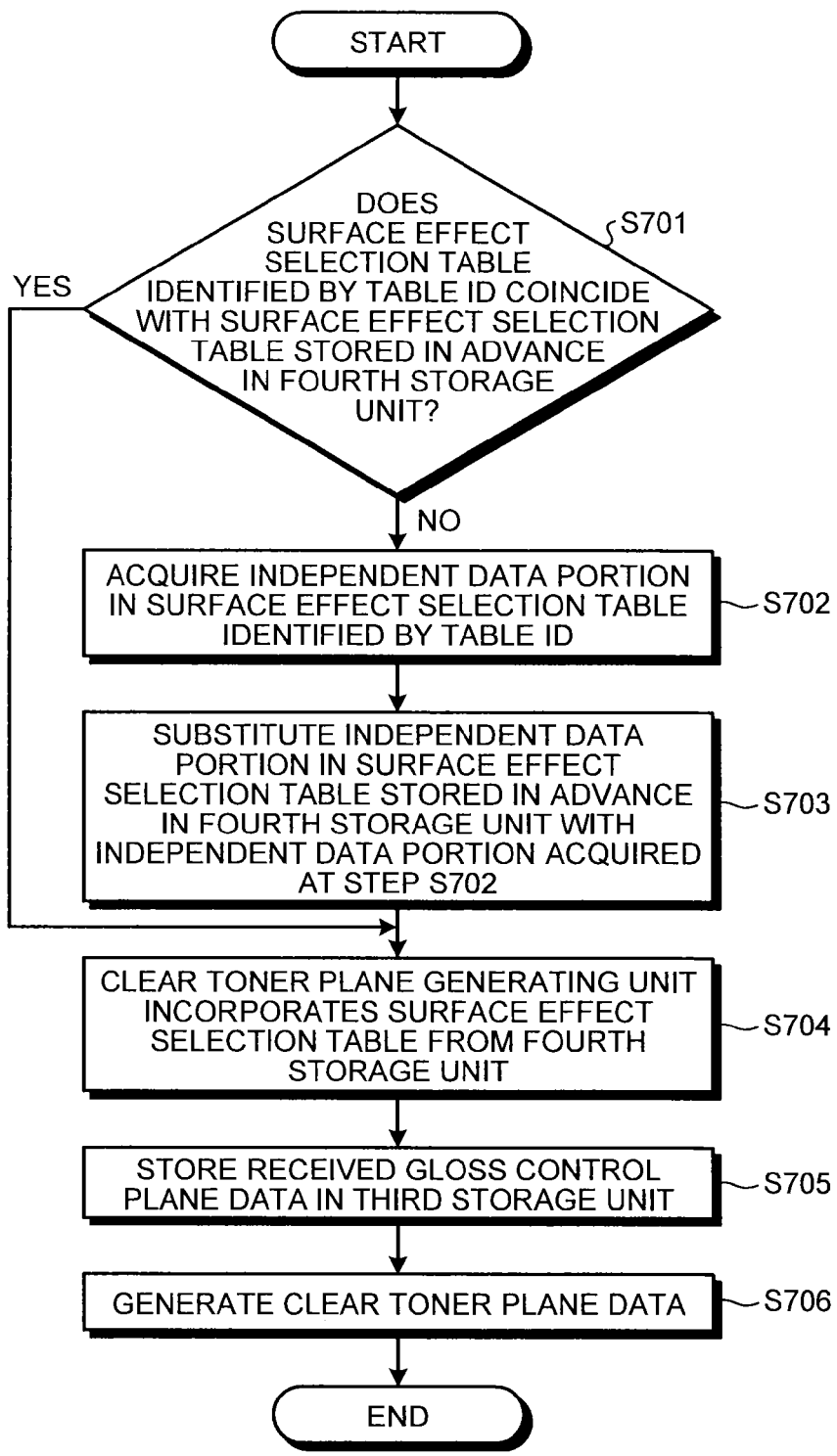
FIG. 7 is a flowchart illustrating a process of generating data of a clear toner plane according to the first embodiment.

FIG. 7 is a flowchart illustrating a process of generating data of a clear toner plane (a clear toner plane data generating process) performed by the clear processing 106. If the receiving unit 110 receives the gloss control plane data, the color plane data, and the table ID received by the clear processing 106, the table ID analyzing unit 112 determines whether the surface effect selection table identified by the table ID received by the receiving unit 110 coincides with the surface effect selection table stored in advance in the fourth storage unit 113 (the surface effect selection table implemented in advance in the DFE 10) (Step S701). If the table ID analyzing unit 112 determines that the surface effect selection table identified by the table ID received by the receiving unit 110 does not coincide with the surface effect selection table stored in advance in the fourth storage unit 113 (No at Step S701), the acquiring unit 114 acquires the independent data portion in the surface effect selection table identified by the table ID received by the receiving unit 110 from the external storage device 60 (Step S702). The acquiring unit 114 then replaces the independent data portion in the surface effect selection table stored in advance in the fourth storage unit 113 with the independent data portion in the surface effect selection table acquired at Step S702 (Step S703).

Subsequently, the clear toner plane generating unit 115 incorporates the surface effect selection table from the fourth storage unit 113 (Step S704). After that, the received gloss control plane data is stored in the third storage unit 111 (Step S705) and the clear toner plane generating unit 115 uses the gloss control plane data stored in the third storage unit 111 to generate clear toner plane data by referring to the surface effect selection table incorporated from the fourth storage unit 113 (Step S706).

As described above, in the present embodiment, if the surface effect selection table identified by the table ID contained in the print data transmitted from the host apparatus 40 does not coincide with the surface effect selection table implemented in advance in the DFE 10, the independent data portion in the surface effect selection table identified by the table ID from the external storage device 60 is acquired. The clear toner plane data is then generated using the independent data portion acquired from the external storage device 60. This can provide the advantageous effect of acquiring the print result equivalent to the expected print result.

The DFE 10 (the clear processing 106) may, for example, have the function of registering the dependent data portion in the surface effect selection table implemented in advance in the DFE 10 in the external storage device 60 (corresponding to the "registering unit" in the claim herein). If the surface effect table including the appropriate dependent data portion does not exist in the external storage device 60, the dependent data portion is registered from the DFE 10 and the independent data portion is registered from the host apparatus 40. This enables a user who is a designer, for example, to readily generate a surface effect selection table and to preview the surface effect applied to a transfer sheet on the viewer 307.

Second Embodiment

The surface effect selection table generating unit 308 included in the host apparatus 40, for example, can variably set an available field and an unavailable field out of the independent data portion in each of the surface effect selection tables stored in the external storage device 60 according to an instruction by a user. If the UI unit 306 receives the instruction to prohibit the use of all of the user-defined patterns in the surface effect selection table illustrated in FIG. 5 (the surface effect selection table to which the table ID indicating "00001" is assigned), the surface effect selection table generating unit 308, for example, removes the data IDs associated with the density values "126" to "140". This can prohibit the surface effects corresponding to the "user-defined pattern" from being provided to the density values "126" to "140".

If the UI unit 306 receives the instruction to prohibit the use of the "user-defined pattern 01" in the surface effect selection table illustrated in FIG. 5, the surface effect selection table generating unit 308, for example, removes the data ID ("UD00001") associated with the density values "126" to "130". This can prohibit the surface effects corresponding to the "user-defined pattern 01" from being provided to the density values "126" to "130". Other surface effect selection tables can be set in the same manner.

The surface effect selection table generating unit 308 can generate an additional surface effect selection table in which an unavailable field is set, different from the surface effect selection table before unavailable field is set therein. The surface effect selection table generating unit 308 can assign an additional table ID to the generated surface effect selection table and register the table in the external storage device 60.

Third Embodiment

Figure 8:
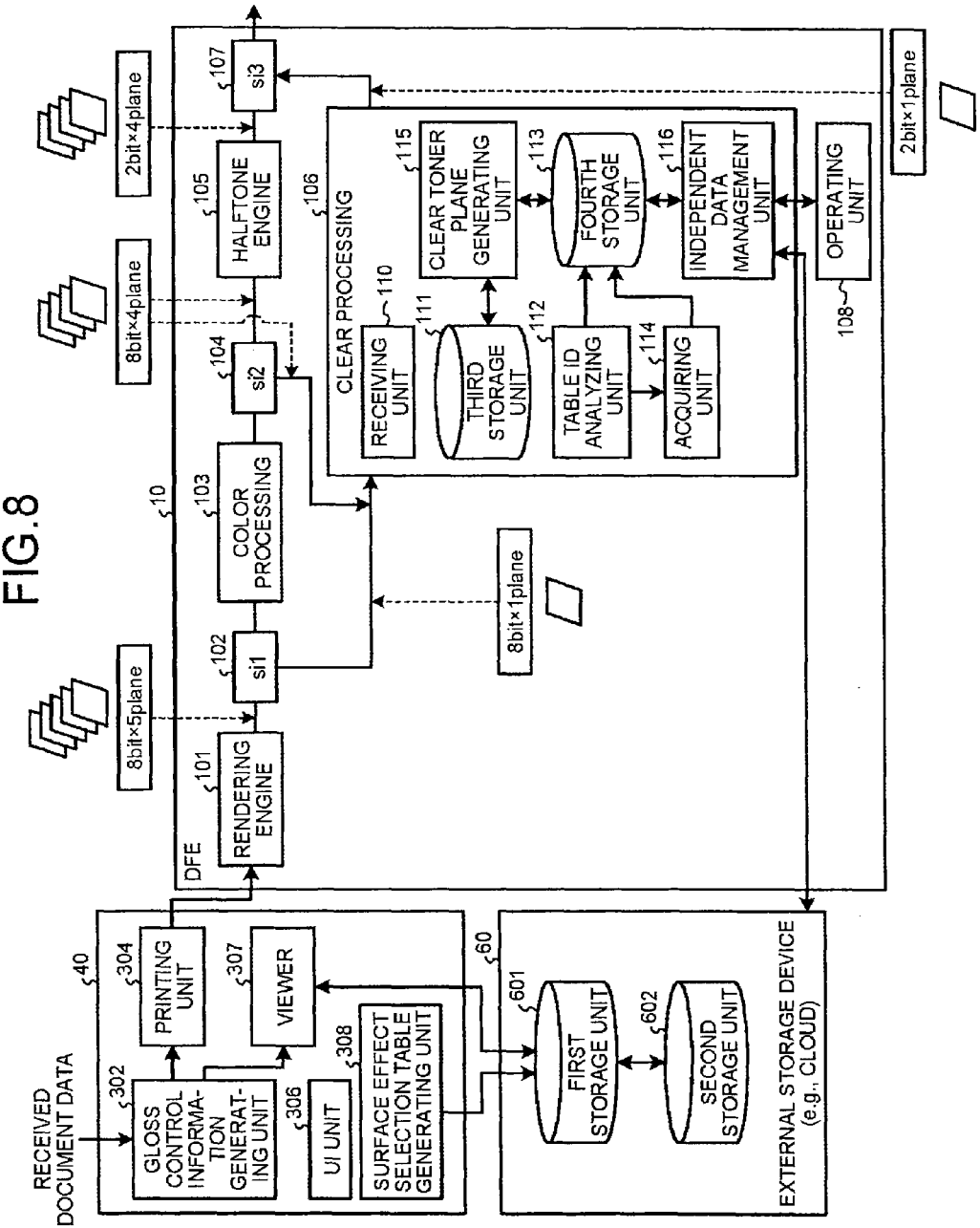
FIG. 8 is a diagram illustrating the functional configuration of an image forming system according to a third embodiment of the present invention.

The DFE 10, for example, may have the function of migrating the independent data portion in the surface effect selection table stored in the fourth storage unit 113 when replacing the image forming system. FIG. 8 is a diagram illustrating the functional configuration of the image forming system according to a third embodiment. The clear processing 106 in the DFE 10 further includes an independent data management unit 116 and the DFE 10 differs from the embodiments described above by further including an operating unit 108.

The independent data management unit 116 has the function of identifying the independent data portion in the surface effect selection table stored in the fourth storage unit 113 and managing the independent data portions. The independent data management unit 116 has the function of migrating the independent data portion in the surface effect selection table stored in the fourth storage unit 113 to the external storage device 60 or restoring the independent data portion migrated to the external storage device 60 on the DFE after implementing a new image forming system, according to an instruction by the user. The number of external storage devices to which the independent data portion is migrated is not limited to one. One or more external storage devices to which the independent data portion may be migrated are hereinafter collectively referred to as an "external storage device 60".

The operating unit 108 is a device used by a user to input various types of settings or instructions. The user operates the operating unit 108 thereby instructing the migration of the independent data portion in the surface effect selection table stored in the fourth storage unit 113 or the restoration of the independent data portion migrated to the external storage device 60.

Figure 9:
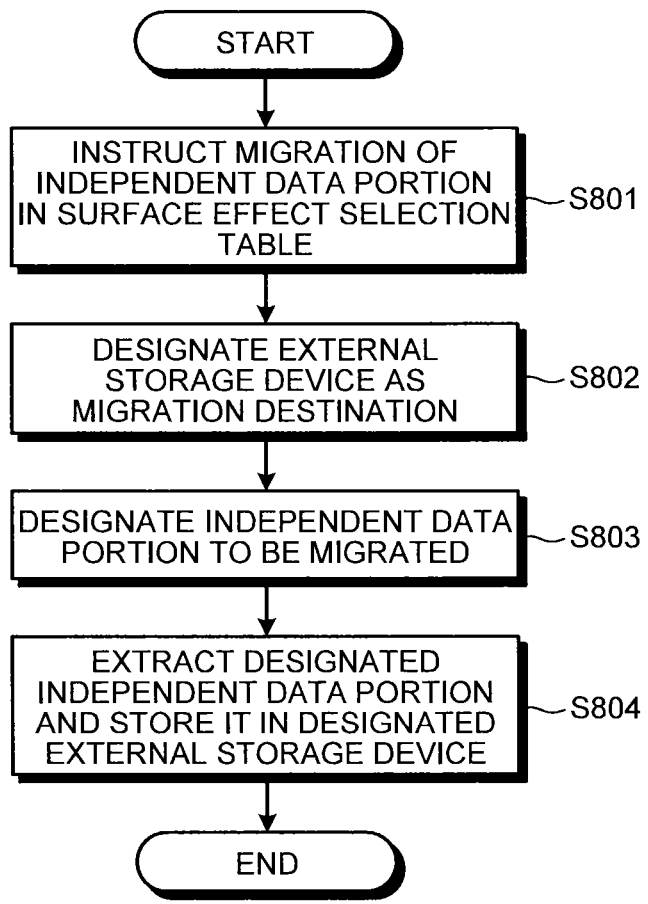
FIG. 9 is a flowchart illustrating a process of migrating independent data to an external storage device according to the third embodiment.
Figure 10:
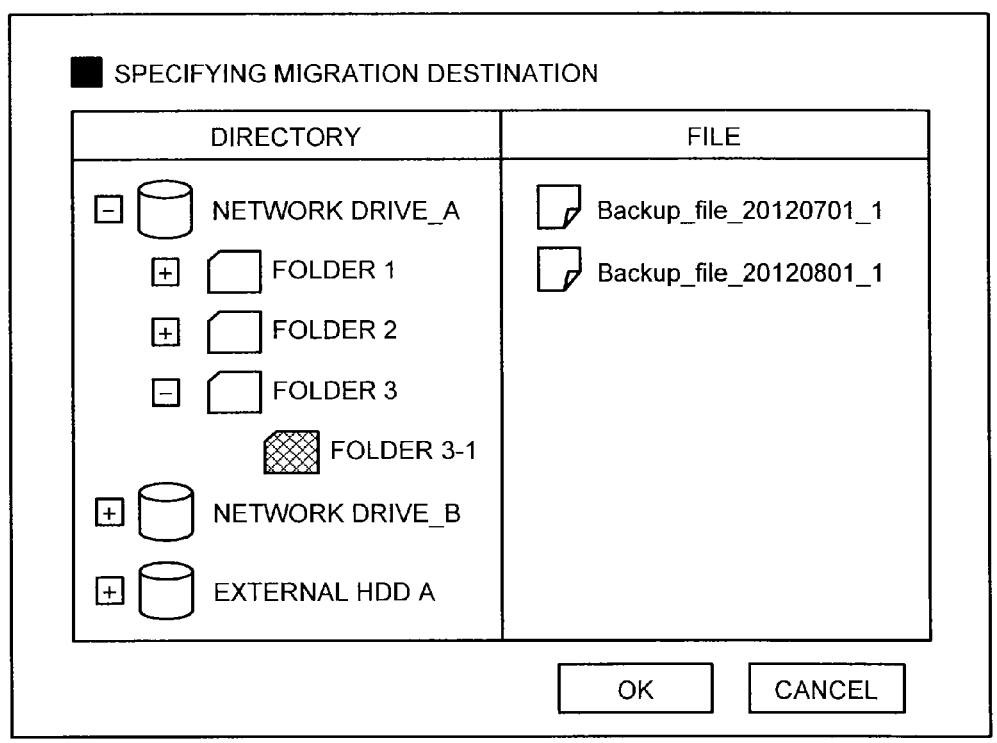
FIG. 10 is a diagram illustrating an input screen in an operating unit according to the third embodiment.

FIG. 9 is a flowchart illustrating a process of migrating independent data to the external storage device 60. As illustrated in FIG. 9, the user operates the operating unit 108 to instruct the migration of the independent data portion in the surface effect selection table stored in the fourth storage unit 113 (Step S801). The user then operates the operating unit 108 to specify the external storage device 60 as the migration destination (Step S802). FIG. 10 is a diagram illustrating an input screen in the operating unit 108 used for designating the migration destination, that is, the external storage device 60. The user can specify the migration destination of the independent data portion using the input screen illustrated in FIG. 10. FIG. 10 illustrates that the network drive_A, the network drive_B, and the external HDD_A are identified as the migration destination, that is, the external storage device 60, and where folder 3-1 in the network drive_A is selected (specified) as the migration destination. FIG. 10 illustrates that the two pieces of migrated data (Backup_file__20120701__1 and Backup_file__20120801__1) are already stored in the folder 3-1.

Figure 11:
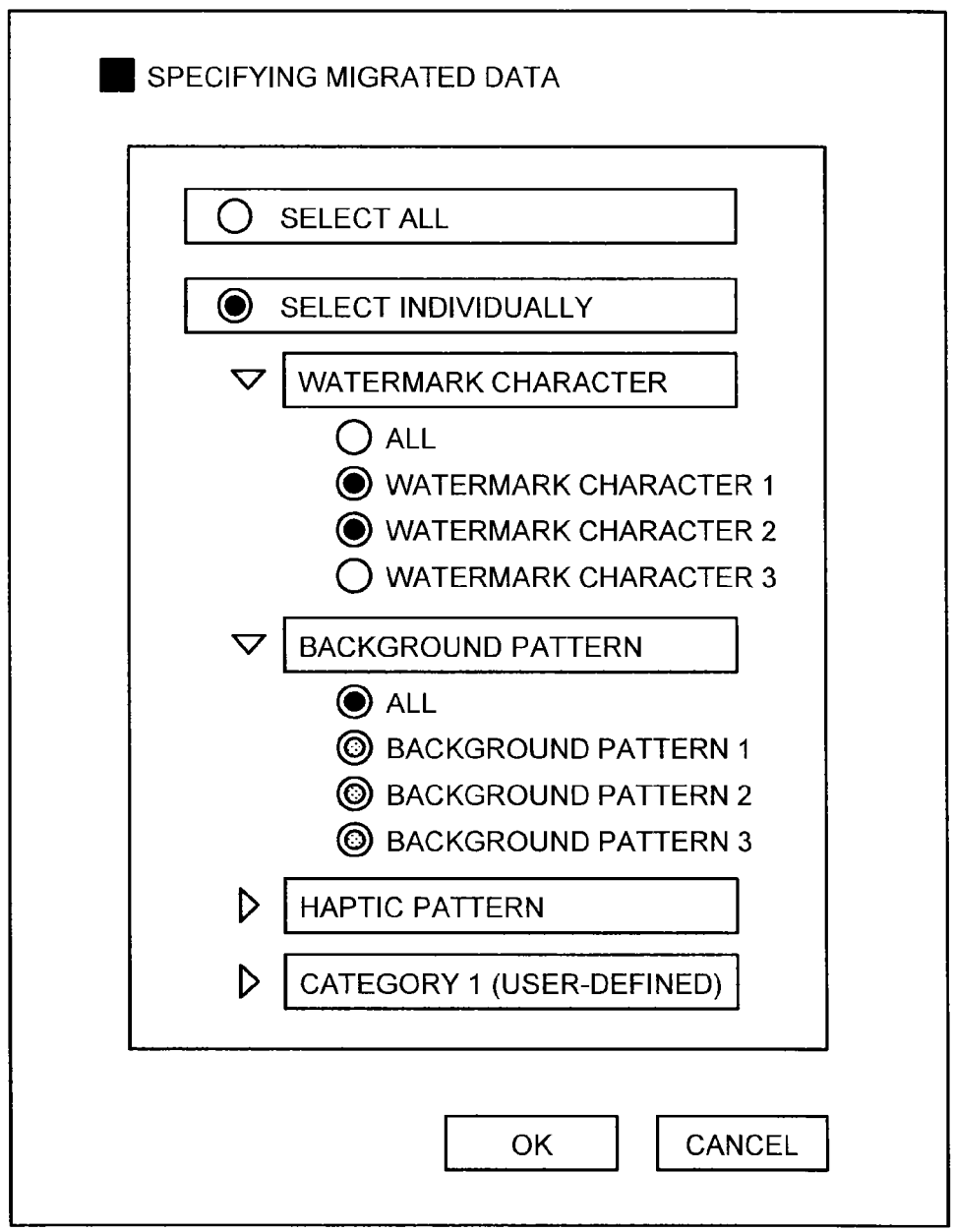
FIG. 11 is a diagram illustrating an input screen in the operating unit according to the third embodiment.

Referring back to FIG. 9, after Step S802 described above, the user operates the operating unit 108, thereby designating the independent data portion to be migrated (Step S803). FIG. 11 is a diagram illustrating an input screen in the operating unit 108 used for designating the independent data to be migrated. The user can specify the independent data portion to be migrated using the input screen illustrated in FIG. 11. The user can select an option in the input screen illustrated in FIG. 11 out of "Select all" and "Select individually". If "Select all" is selected, the user can specify all of the independent data portions in the surface effect selection table stored in the fourth storage unit 113 simultaneously. If "Select individually" is selected, the user can individually specify any item out of the categorized items. FIG. 11 illustrates that "Select individually" is selected and the watermark character 1, the watermark character 2, and all of the background patterns are selected. Because all of the background patterns are selected, the individual patterns attributing to the background pattern (the background patterns 1, 2, and 3) are grayed out so as not to be specified. If the user categorizes the independent data portions, the user can specify the migrated data by category. FIG. 11 illustrates that the independent data portions corresponding to "the user-defined pattern" is categorized into a "category 1".

Referring back to FIG. 9, after Step S803 described above, the independent data management unit 116 extracts the independent data portion specified at Step S803 from the surface effect selection table stored in the fourth storage unit 113 and stores (migrates) the extracted independent data portion in the external storage device 60 specified at Step S802 (Step S804).

Figure 12:
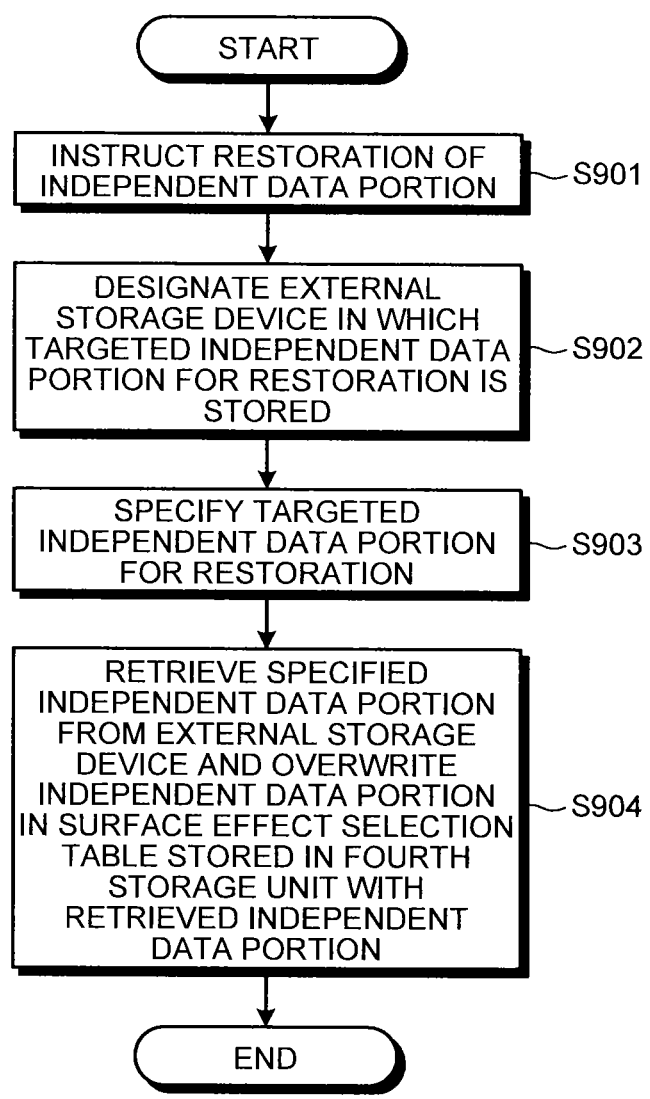
FIG. 12 is a flowchart illustrating a process of restoring on the DFE the independent data migrated to an external storage device according to the third embodiment.

FIG. 12 is a flowchart illustrating a process of restoring on the DFE the independent data migrated to the external storage device 60. The user operates the operating unit 108 to instruct the restoration of the migrated independent data portion (Step S901). The user then operates the operating unit 108 to specify the external storage device 60 in which the targeted independent data portion for restoration is stored (Step S902). Subsequently, the user then operates the operating unit 108 to specify the targeted independent data portion for restoration (Step S903). After that, the independent data management unit 116 retrieves the independent data portion specified at Step S903 from the external storage device 60 specified at Step S902 and overwrites the independent data portion in the surface effect selection table stored in the fourth storage unit 113 with the retrieved independent data portion (Step S904). If the user sets, in the same manner as the above-described second embodiment, an unavailable field and an available field on the items into which the independent data portion is categorized, the independent data management unit 116 overwrites the independent data portion according to the setting.

Figure 13:
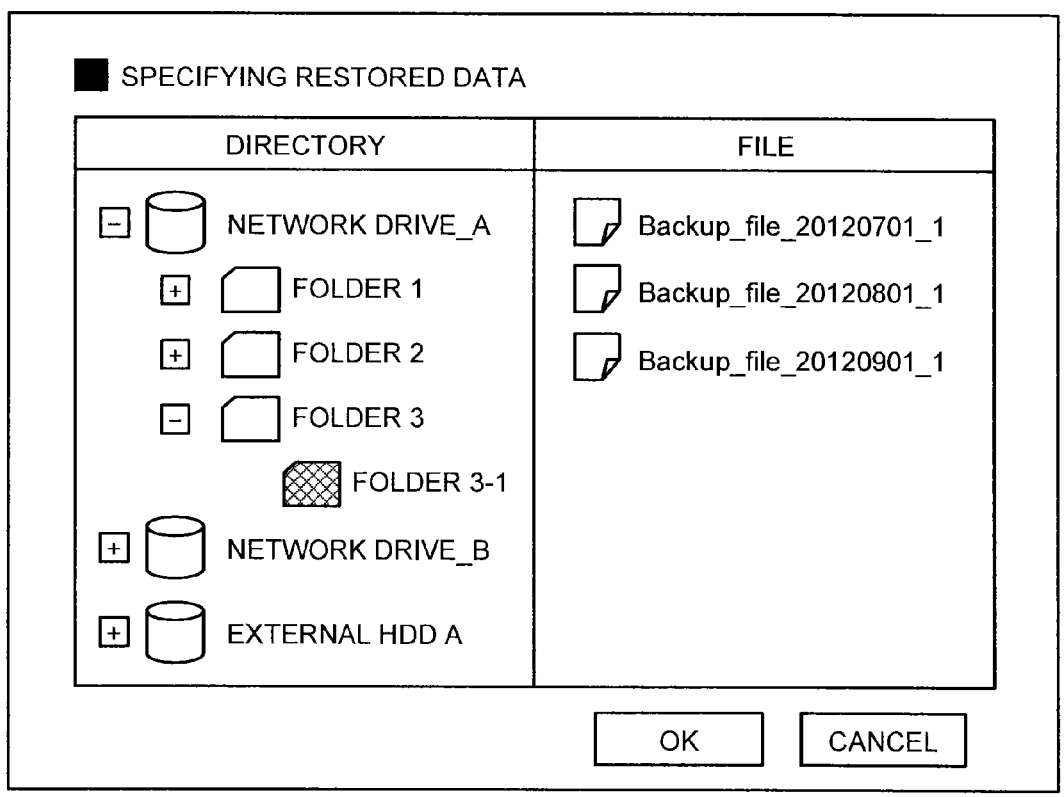
FIG. 13 is a diagram illustrating an input screen in the operating unit according to the third embodiment.

FIG. 13 is a diagram illustrating an input screen in the operating unit 108 used for designating the independent data to be restored. The user can specify the targeted independent data portion for restoration using the input screen illustrated in FIG. 13. FIG. 13 illustrates that the migrated data (Backup_file__20120901__1) stored in the folder 3-1 in the network drive_A is specified as the targeted independent data portion for restoration.

Fourth Embodiment

In an image forming system according to a fourth embodiment, some of the functions of the DFE are implemented on a server apparatus on a network.

Figure 14:
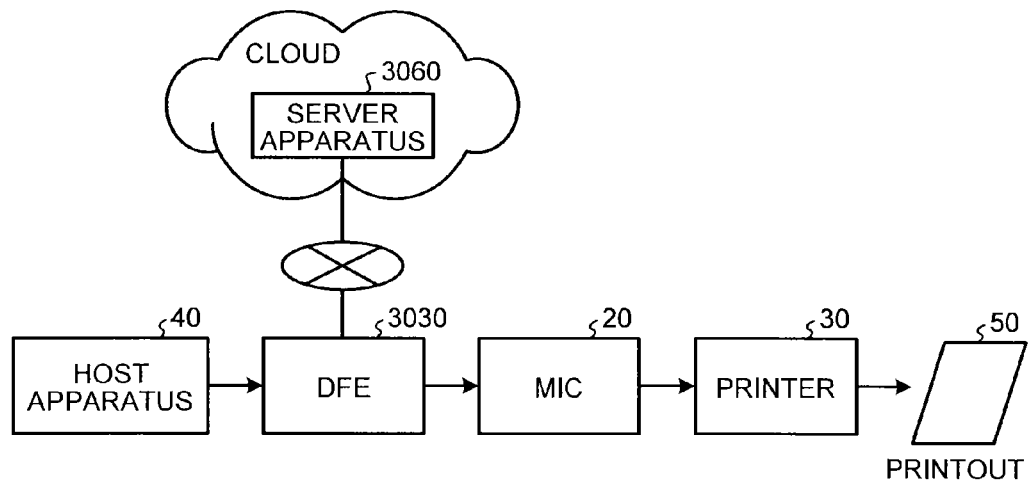
FIG. 14 is a diagram illustrating the functional configuration of an image forming system according to a fourth embodiment of the present invention.

FIG. 14 is a diagram illustrating the functional configuration of the image forming system according to the fourth embodiment. As illustrated in FIG. 14, the image forming system according to the fourth embodiment includes a host apparatus 40, a DFE 3030, a MIC 20, and a printer 30.

In the configuration according to the fourth embodiment, the DFE 3030 is connected to the server apparatus 3060 over a network such as the Internet. In the fourth embodiment, the function of the clear processing 106 included in the DFE 10 in the first embodiment is provided in a server apparatus 3060.

Specifically, in the fourth embodiment, the DFE 3030 is connected to the server apparatus 3060 provided in singularity over a network such as the Internet (cloud), and the server apparatus 3060 is provided with the function of the clear processing 106 included in the DFE 10 according to the first embodiment. The server apparatus 3060 generates a clear toner plane data.

Figure 15:
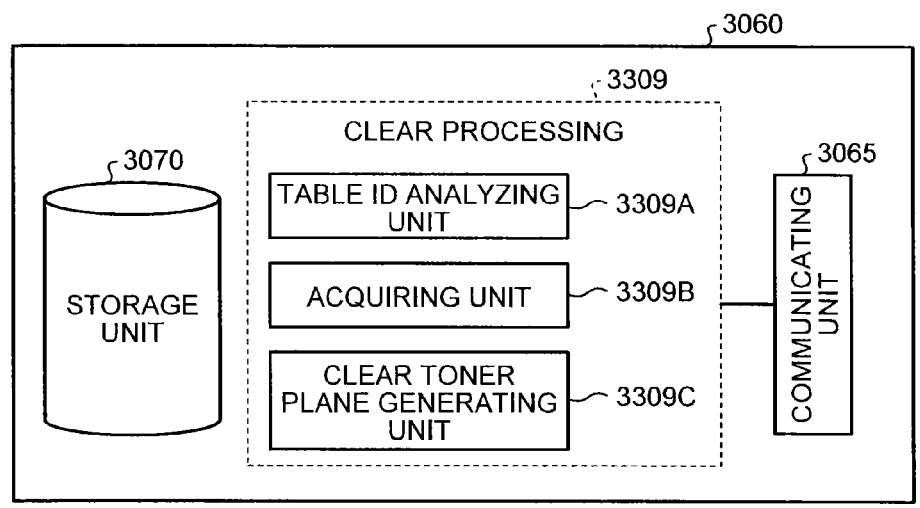
FIG. 15 is a diagram illustrating the functional configuration of a server apparatus according to the fourth embodiment.

The server apparatus 3060 will now be explained. FIG. 15 is a block diagram illustrating a functional configuration of the server apparatus 3060 according to the fourth embodiment. The server apparatus 3060 includes a storage unit 3070, the clear processing 3309, and a communicating unit 3065. The clear processing 3309 includes a table ID analyzing unit 3309A, an acquiring unit 3309B, and a clear toner plane generating unit 3309C.

The storage unit 3070 is a storage medium such as an HDD or a memory. The storage unit 3070 includes the first storage unit 601, the second storage unit 602, the third storage unit 111, and the fourth storage unit 113 provided in the first the embodiment. The communicating unit 3065 transmits and receives various types of data and requests to and from the DFE 3030. More specifically, the communicating unit 3065 receives the information on the gloss control plane data, the color plane data, and the table ID that has been input in the clear processing 106 in the first embodiment from the DFE 3030. The communicating unit 3065 also transmits the clear toner plane data generated by the clear processing 3309 to the DFE 3030.

The function of the clear processing 3309 is the same as that of the clear processing 106 in the first embodiment.

Figure 16:
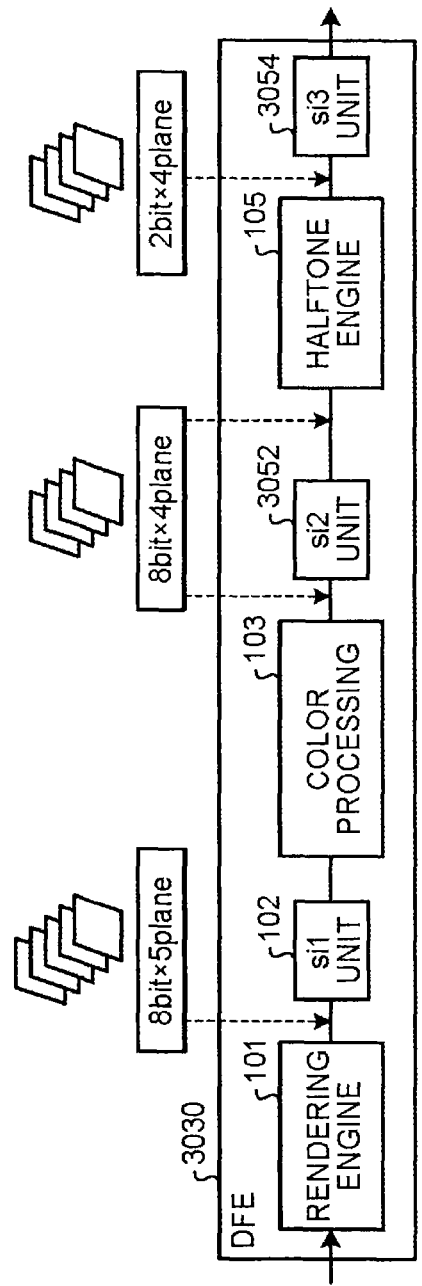
FIG. 16 is a diagram illustrating the functional configuration of a digital front end (DFE) according to the fourth embodiment

The DFE 3030 will now be explained. FIG. 16 is a block diagram illustrating an example of the functional configuration of the DFE 3030 according to the fourth embodiment. The DFE 3030 according to the fourth embodiment mainly includes the rendering engine 101, the si1 unit 102, the color processing 103, an si2 unit 3052, a halftone engine 105, and the si3 unit 3054. The functions and the configurations of the rendering engine 101, the si1 unit 102, the color processing 103, and the halftone engine 105 are the same as those included in the DFE 10 in the first embodiment.

An si2 unit 3052 according to the present embodiment transmits the eight-bit data of a gloss control plane converted by the rendering engine 101, the eight-bit image data of CMYK color planes after the gamma correction by the color processing 103 (the color plane data), and a generation request of the clear toner plane to the server apparatus 3060. An si3 unit 3054 receives the clear toner plane data from the server apparatus 3060.

Figure 17:
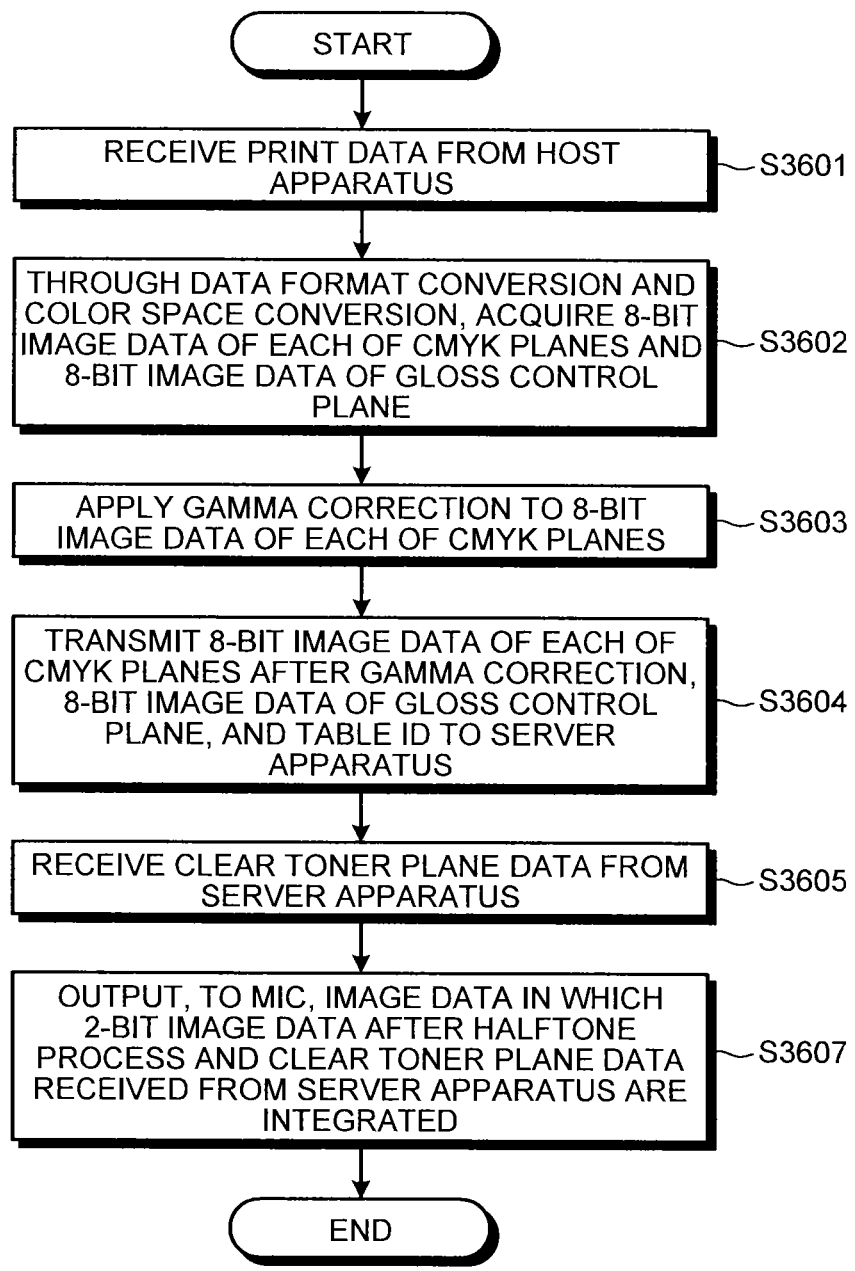
FIG. 17 is a flowchart illustrating operations of the DFE according to the fourth embodiment.

FIG. 17 is a flowchart illustrating operations of the DFE 3030 according to the fourth embodiment. As illustrated in FIG. 17, when the DFE 3030 receives the print data from the host apparatus 40 (Step S3601), the rendering engine 101 parses the image data thus received, and converts the image data in a vector format into image data in a raster format, and converts the color space represented in the RGB format into the color space represented in the CMYK format. The rendering engine 101 then acquires eight-bit image data of each of the CMYK color planes and eight-bit image data of a gloss control plane (Step S3602).

Once the eight-bit data of the gloss control plane is output, the color processing 103 in the DFE 3030 performs a gamma correction to the eight-bit image data of each of the CMYK color planes, using a gamma curve of 1D_LUT generated through a calibration (Step S3603).

Subsequently, the si2 unit 3052 in the DFE 3030 transmits the eight-bit image data of CMYK color planes after the gamma correction, the eight-bit data of a gloss control plane, and the table ID contained in the print data to the server apparatus 3060 (Step S3604) and requests generation of the clear toner plane data.

Figure 18:
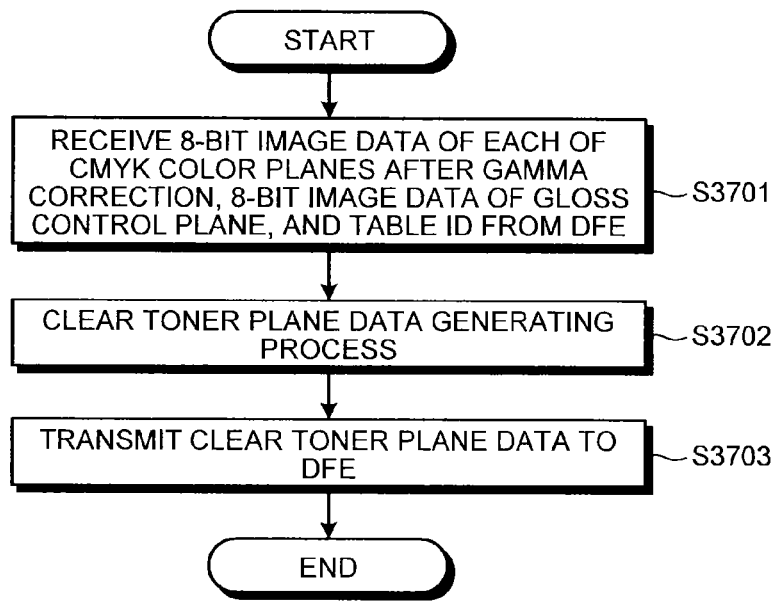
FIG. 18 is a flowchart illustrating operations of the server apparatus according to the fourth embodiment.

A process of generating data of a clear toner plane performed by server apparatus 3060 will now be explained. FIG. 18 is a flowchart illustrating the process of generating data of a clear toner plane performed by the server apparatus 3060. As illustrated in FIG. 18, after receiving the eight-bit image data of CMYK color planes after the gamma correction, the clear toner plane data, and the table ID from the DFE 3030 (Step S3701), the clear processing 3309 in the server apparatus 3060 executes a clear toner plane data generating process (Step S3702). Details of the clear toner plane data generating process executed by the clear processing 3309 is similar to the clear toner plane data generating process executed by the clear processing 106 in the DFE 10 according to the above-described first embodiment. The communicating unit 3065 then transmits the clear toner plane data acquired through the clear toner plane data generating process at Step S3702 to the DFE 3030 (Step S3703).

Referring back to FIG. 17, after Step S3604 described above, the DFE 3030 receives the clear toner plane data from the server apparatus 3060 (Step S3605). The si3 unit 3054 outputs the image data into which the clear toner plane data received from the server apparatus 3060 and the two-bit color plane data after the halftone process by the halftone engine 105 are integrated, to the MIC 20 (Step S3607).

In the present embodiment, as described above, some of the functions of the DFE are provided on the server apparatus 3060 and the above-described clear toner plane data generating process is performed on the server apparatus 3060 in the cloud.

In the fourth embodiment, the function of the process of generating data of a clear toner plane is included in the server apparatus 3060 provided in the cloud in singularity, and the server apparatus 3060 is configured to perform the plane data generating process for generating color plane data. However, the present invention is not limited thereto.

For example, a plurality of server apparatuses may be provided in the cloud, and the process of generating data of a clear toner plane may be performed in a manner distributed among the server apparatuses.

All or some of the processes performed by the host apparatus 40 and other processes performed by the DFE 3030 may be provided centrally to a single server, or distributed among a plurality of server apparatus in any way.

In other words, any of a plurality of processes performed by one single apparatus may be performed by one or more apparatuses connected to the one apparatus over a network.

When the processes are performed by "one or more other apparatuses connected to the one apparatus over a network" in the manner mentioned above, such a configuration need to include data input/output processes performed between the one apparatus and the other apparatus(es) and between the other apparatuses, e.g., a process of causing the one apparatus to output data (information) resulting from a process performed by the one apparatus to the other apparatus(es), and a process of causing the other apparatus(es) to receive the data.

In other words, when the other apparatus is provided in singularity, data input/output processes are performed between the one apparatus and the other apparatus. When the other apparatus is provided in plurality, the configuration includes data input/output processes performed between the other apparatuses, e.g., between a first other apparatus and a second other apparatus, as well as the processes performed between the one apparatus and the other apparatuses.

Furthermore, in the fourth embodiment, the server apparatus 3060 is provided in the cloud. However, the present invention is not limited thereto. For example, one or more server apparatuses such as the server apparatus 3060 may be provided in any network, e.g., an intranet.

Figure 19:
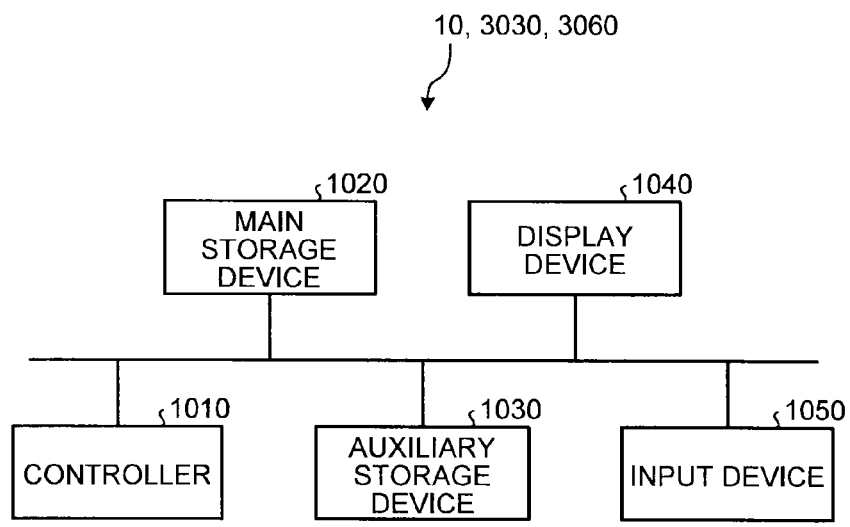
FIG. 19 is a diagram of the hardware configuration of the DFE and the server apparatus according to the embodiments.

FIG. 19 is a block diagram of the hardware configuration of the DFE 10, the DFE 3030, and the server apparatus 3060 according to the above-described embodiments. The DFE 10, the DFE 3030, or the server apparatus 3060 according to the embodiments includes a controller 1010 such as a CPU, a main storage device 1020 such as a read only memory (ROM) or a random access memory (RAM), an auxiliary storage device 1030 such as an HDD and a CD drive, a display device 1040 such as a display device, an input device 1050 such as a keyboard and a mouse, and has a hardware configuration using a regular computer.

The controlling program executed by the DFE 10, the DFE 3030, or the server apparatus 3060 according to the embodiments is provided in a manner recorded in a computer-readable recording medium such as a compact disc read-only memory (CD-ROM), a flexible disk (FD), a compact disc recordable (CD-R), and a digital versatile disc (DVD), as a file in an installable or executable format.

The controlling program executed by the DFE 10, the DFE 3030, or the server apparatus 3060 according to the embodiments may be stored in a computer connected to a network such as the Internet, and made available for download over the network. The controlling program executed by the DFE 10, the DFE 3030, or the server apparatus 3060 according to the embodiments may be provided or distributed over a network such as the Internet. The controlling program executed by the DFE 10, the DFE 3030, or the server apparatus 3060 according to the embodiments may be provided incorporated in advance in a ROM or the like.

In the image forming system according to the embodiments, an image is formed using a plurality of color toners of CMYK, however, an image may be formed using a toner of one color.

The printer system according to the embodiments includes the MIC 20, but the configuration is not limited thereto. The processes performed by the MIC 20 and the functions of the MIC 20 may be provided to another unit such as the DFE 10, and the MIC 20 may be omitted.

According to an embodiment, a print result equivalent to the expected print result can be achieved if gloss control plane data based on a surface effect selection table different from the surface effect selection table implemented in advance is input.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print controlling apparatus that is equipped with at least one color toner and at least one colorless clear toner and controls a printing apparatus forming an image on a recording medium based on one or more pieces of color plane data for causing the color toner to be attached and one or more pieces of clear toner plane data for causing the clear toner to be attached, the print controlling apparatus comprising:
   a receiving unit that receives input data including:
      gloss control plane data indicating a surface effect type to be achieved on the recording medium with certain density information; and
      table identifying information for identifying a surface effect selection table indicating a corresponding relation between the surface effect type and the density information used to generate the gloss control plane data;
   an acquiring unit that acquires an independent data portion indicating a portion corresponding to the surface effect type capable of being achieved independent from competence of the printing apparatus, out of the surface effect selection table identified by the table identifying information included in the input data from an external device; and
   a generating unit that generates the clear toner plane data using the independent data portion acquired by the acquiring unit.

2. The print controlling apparatus according to claim 1, wherein the acquiring unit replaces the independent data portion in the surface effect selection table implemented in advance in the print controlling apparatus with the independent data portion acquired from the external device.

3. The print controlling apparatus according to claim 2, wherein if the surface effect selection table identified by the table identifying information included in the input data coincides with the surface effect selection table implemented in advance in the print controlling apparatus, the generating unit uses the surface effect selection table implemented in advance in the print controlling apparatus to generate the clear toner plane data.

4. The print controlling apparatus according to claim 2, further comprising a registering unit that registers, to the external device, a dependent data portion indicating a portion corresponding to the surface effect type capable of being achieved dependent on the competence of the printing apparatus, out of the surface effect selection table implemented in advance in the print controlling apparatus.

5. An image forming system including:
a print controlling apparatus that is equipped with at least one color toner and at least one colorless clear toner and controls a printing apparatus forming an image on a recording medium based on one or more pieces of color plane data for causing the color toner to be attached and one or more pieces of clear toner plane data for causing the clear toner to be attached; and
a server apparatus connected to the print controlling apparatus over a network, the image forming system comprising:
   a receiving unit that receives input data including:
      gloss control plane data indicating a surface effect type to be achieved on the recording medium with certain density information; and
      table identifying information for identifying a surface effect selection table indicating a corresponding relation between the surface effect type and the density information used to generate the gloss control plane data;
   an acquiring unit that acquires an independent data portion indicating a portion corresponding to the surface effect type capable of being achieved independent from competence of the printing apparatus, out of the surface effect selection table identified by the table identifying information included in the input data; and
   a generating unit that generates the clear toner plane data using the independent data portion acquired by the acquiring unit.

6. A computer program product comprising a non-transitory computer-readable medium containing an information processing program, the program causing a print controlling apparatus that comprises at least one color toner and at least one colorless clear toner and controls a printing apparatus forming an image on a recording medium based on one or more pieces of color plane data for causing the color toner to be attached and one or more pieces of clear toner plane data for causing the clear toner to be attached, to execute:
   receiving input data including:
      gloss control plane data indicating the surface effect type to be achieved on the recording medium with certain density information; and
      table identifying information for identifying the surface effect selection table indicating a corresponding relation between the surface effect type and the density information used to generate the gloss control plane data;
   acquiring an independent data portion indicating a portion corresponding to the surface effect type capable of being achieved independent from competence of the printing apparatus, out of the surface effect selection table identified by the table identifying information included in the input data from an external device; and
   generating the clear toner plane data using the independent data portion acquired at the acquiring.

* * * * *